(12) United States Patent
Xiao et al.

(10) Patent No.: US 9,240,915 B2
(45) Date of Patent: Jan. 19, 2016

(54) SIGNAL PROCESSING IN WIRELESS COMMUNICATION SYSTEM

(71) Applicant: EMPIRE TECHNOLOGY DEVELOPMENT LLC, Wilmington, DE (US)

(72) Inventors: Yue Xiao, Sichuan (CN); Jian Zhang, Shaanxi (CN); Jun Fang, Shaanxi (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/361,705

(22) PCT Filed: Jun. 4, 2013

(86) PCT No.: PCT/CN2013/076689
§ 371 (c)(1),
(2) Date: May 30, 2014

(87) PCT Pub. No.: WO2014/194465
PCT Pub. Date: Dec. 11, 2014

(65) Prior Publication Data
US 2015/0063479 A1 Mar. 5, 2015

(51) Int. Cl.
*H04L 1/02* (2006.01)
*H04L 27/26* (2006.01)
*H04B 7/04* (2006.01)

(52) U.S. Cl.
CPC .......... *H04L 27/2601* (2013.01); *H04B 7/0413* (2013.01); *H04L 27/26* (2013.01)

(58) Field of Classification Search
CPC ............ H04L 25/0204; H04L 27/2647; H04L 2025/03414; H04L 2025/03426; H04L 25/022; H04L 5/0007

USPC ........................................................ 375/267
See application file for complete search history.

(56) References Cited

U.S. PATENT DOCUMENTS 7,885,228 B2 * 2/2011 Walton et al. ................. 370/329
7,940,848 B2   5/2011 Fechtel
(Continued)

FOREIGN PATENT DOCUMENTS

CN        101102295 A    1/2008
CN        101478512 A    7/2009

OTHER PUBLICATIONS

Imad Barhumi et al., "Equalization for OFDM Over Doubly Selective channels," IEEE transactions on signal processing, Apr. 2006, pp. 1445-1458, vol. 54, No. 4.
(Continued)

*Primary Examiner* — Michael Neff
*Assistant Examiner* — David S Huang
(74) *Attorney, Agent, or Firm* — Ren-Sheng International

(57) ABSTRACT

Embodiments of the present disclosure may generally relate to methods for processing a response matrix of a communication system. One example method may comprise dividing the response matrix into a plurality of clusters. The number of the clusters is associated with the number of subcarriers of the communication system, and the clusters are indexed in sequence as even-indexed clusters and odd-indexed clusters. The method may further comprise estimating data transmitted by a first set of transmit antennas of the communication system through a first subcarrier and a second subcarrier of the subcarriers associated with a first even-indexed cluster. The method may further comprise modifying a first receive vector of the communication system based on the estimated data transmitted by the first set of transmit antennas as a second receive vector of the communication system.

20 Claims, 7 Drawing Sheets

(56) References Cited

U.S. PATENT DOCUMENTS

| 8,781,043 | B2* | 7/2014 | Shim et al. | 375/350 |
|---|---|---|---|---|
| 2006/0109923 | A1 | 5/2006 | Cai et al. | |
| 2006/0222094 | A1* | 10/2006 | Makhlouf et al. | 375/260 |
| 2008/0080630 | A1* | 4/2008 | Sung | 375/260 |
| 2010/0027698 | A1* | 2/2010 | Kim et al. | 375/260 |

OTHER PUBLICATIONS

G. J. Foschini et al., "On Limits of Wireless Communications in a Fading Environment when Using Multiple Antennas," Wireless Personal Communications, 1998, pp. 311-335, vol. 6, Kluwer Academic Publishers.

Sheng-Wei Hou et al., "Intercarrier Interference Suppression for OFDMA Uplink in Time and frequency-selective Fading channels," IEEE Transactions on Vehicular Technology, Jul. 2009, pp. 2741-2754, vol. 58, No. 6.

Kwanghoon Kim et al., "Modified Successive Interference Cancellation for MIMO OFDM on Doubly Selective Channels," VTC Spring 2009. IEEE 69th Vehicular Technology Conference, 2009, pp. 1-5.

Kwanghoon Kim et al., "A Low Complexity ICI Cancellation Method for High Mobility OFDM Systems," IEEE Vehicular Technology conference, 2006, pp. 2528-2532, vol. 5.

Chun-Fu Liao et al., "Latency-Constrained Low-Complexity Lattice Reduction for MIMO-OFDM Systems," IEEE International Conference on Acoustics, Speech and Signal Processing (ICASSP), 2011, pp. 1677-1680.

Andreas F. Molisch et al., "Iterative Methods for Cancellation of Intercarrier Interference in OFDM Systems," IEEE Transaction on vehicular technology, Jul. 2007, pp. 2158-2167, vol. 56, No. 4.

Zijian Tang et al., "Pilot-Assisted Time-Varying OFDM Channel Estimation," IEEE International Conference on Acoustics, Speech and Signal Processing, 2006, pp. IV-133-IV-136.

Abdelhamid Younis et al., "Reduced Complexity Sphere Decoder for Spatial Modulation Detection Receivers," IEEE Communications Society Subject Matters Experts for Publication in the IEEE Globecom 2010 Proceedings, 2010 pp. 1-5.

Lei Zhang et al., "BER-Minimizing Limited Feedback for Transmit Beamforming in MISO-OFDM Systems," International Journal of Multimedia and Ubiquitous Engineering, Apr. 2008, pp. 77-84, vol. 3, No. 2.

Notification of Transmittal of the International Search Report and the Written Opinion of the International Searching Authority, Application No. PCT/CN2013/076689, Mar. 13, 2014.

* cited by examiner

SIGNAL PROCESSING IN WIRELESS COMMUNICATION SYSTEM

CROSS REFERENCE TO RELATED APPLICATION

The present application is a U.S. National Stage filing under 35 U.S.C. §371 of International Application PCT/CN2013/076689, filed on Jun. 4, 2013, entitled "SIGNAL PROCESSING IN WIRELESS COMMUNICATION SYSTEM." The International Application, including any appendices or attachments thereof, is hereby incorporated by reference in its entirety.

BACKGROUND OF THE DISCLOSURE

Orthogonal frequency division multiplexing (OFDM) is a method of encoding digital data on multiple subcarrier frequencies. In OFDM, the subcarriers overlap and orthogonal to each other. Synchronizations in frequency and time among subcarriers are important to maintain the orthogonality. With the frequency deviations, the subcarriers may not longer be orthogonal and thus an inter-carrier interference occurs. Some equalization approaches were proposed to address the inter-carrier interference issues, such as linear minimum mean-square-error or minimum mean-square-error. However, those approaches have adoption issues on a multiple-input multiple-output system.

SUMMARY

Figure 1:
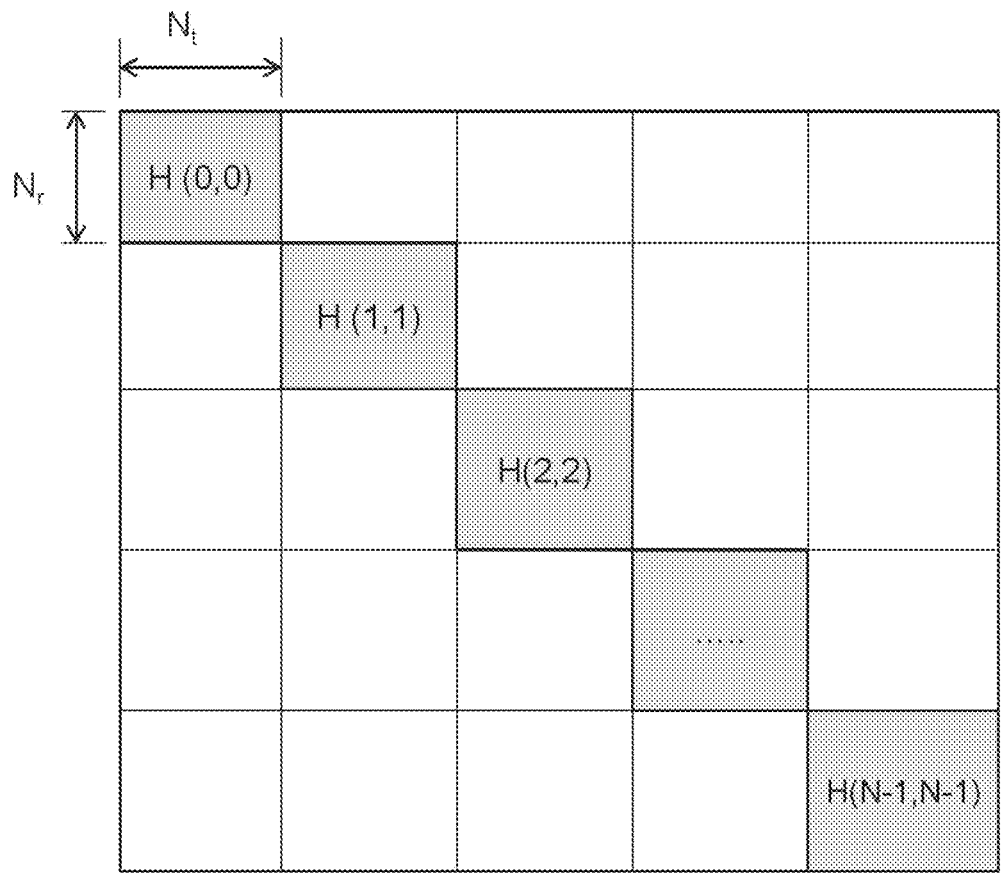
FIG. 1 shows a structure of a response matrix of a communication system when the subcarriers of the communication system are orthogonal to each other.

Some embodiments of the present disclosure may generally relate to methods for processing a response matrix of a communication system. One example method may comprise dividing the response matrix into a plurality of clusters. The number of the clusters is associated with the number of subcarriers of the communication system, and the clusters are indexed in sequence as even-indexed clusters and odd-indexed clusters. The method may further comprise estimating data transmitted by a first set of transmit antennas of the communication system through a first subcarrier and a second subcarrier of the subcarriers associated with a first even-indexed cluster. The method may further comprise modifying a first receive vector of the communication system based on the estimated data transmitted by the first set of transmit antennas as a second receive vector of the communication system.

Additional embodiments of the present disclosure may generally relate to a computer-readable medium containing instructions for processing a response matrix of a communication system. One example computer-readable medium may contain instructions, which when executed by a computing device, causes the computing device to divide the response matrix into a plurality of clusters, wherein the number of the clusters is associated with the number of subcarriers of the communication system, and the clusters are indexed in sequence as even-indexed clusters and odd-indexed clusters, estimate data transmitted by a first set of transmit antennas of the communication system through a first subcarrier and a second subcarrier of the subcarriers associated with a first even-indexed cluster; and modify a first receive vector of the communication system based on the estimated data transmitted by the first set of transmit antennas as a second receive vector of the communication system.

Other embodiments of the present disclosure may generally relate to a computing device configured to process a response matrix of a communication system. One example computing device includes a processing unit. The processing unit is configured to divide the response matrix into a plurality of clusters wherein the number of the clusters is associated with the number of subcarriers of the communication system, and the clusters are indexed in sequence as even-indexed clusters and odd-indexed clusters, estimate data transmitted by a first set of transmit antennas of the communication system through a first subcarrier and a second subcarrier of the subcarriers associated with a first even-indexed cluster, and modify a first receive vector of the communication system based on the estimated data transmitted by the first set of transmit antennas as a second receive vector of the communication system.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

This disclosure is drawn, inter alia, to methods, apparatus, computer programs, and systems of processing a response matrix of a communication system.

In this disclosure, a wireless communication system may be a multiple input and multiple output (MIMO) system. A MIMO system includes a transmitter with multiple transmit antennas and a receiver with multiple receive antennas. In some embodiments, OFDM is used in the MIMO system. The MIMO system may have Nr receive antennas and Nt transmit antennas and Nr is not less than Nt. The relationship between transmit signals and receive signals may be expressed as:

$$Y = HX + W, \quad (1)$$

where $Y = [Y(0)^T, Y(1)^T, \ldots Y(N-1)^T]^T$ is the receive vector of the MIMO system which denotes receive data received on all subcarriers and from all receive antennas, $X = [X(0)^T, X(1)^T, \ldots X(N-1)^T]^T$ is the transmit vector of the MIMO system which denotes transmit data transmitted on all subcarriers and by all transmit antennas and N is the number of subcarriers in the MIMO system, W denotes the additive white Gaussian noise, and H is the response matrix. $Y(k) = [Y_1(k), Y_2(k), \ldots Y_{Nr}(k)]^T$ denotes receive data received on subcarrier k, and k is from 0 to (N−1). $X(i) = [X_1(i), X_2(i), \ldots X_{Nt}(i)]^T$ denotes transmit data on subcarrier i, and i is from 0 to (N−1). The response matrix H may be expressed as:

$$H = \begin{bmatrix} H(0,0) & H(0,1) & \cdots & H(0,N-1) \\ H(1,0) & H(1,1) & \cdots & H(1,N-1) \\ \vdots & \vdots & \ddots & \vdots \\ H(N-1,0) & H(N-1,1) & \cdots & H(N-1,N-1) \end{bmatrix} \quad (2)$$

$$\text{where } H(k,i) = \begin{bmatrix} H^{1,1}(k,i) & H^{1,2}(k,i) & \cdots & H^{1,Nt}(k,i) \\ H^{2,1}(k,i) & H^{2,2}(k,i) & \cdots & H^{2,Nt}(k,i) \\ \vdots & \vdots & \ddots & \vdots \\ H^{Nr,1}(k,i) & H^{Nr,2}(k,i) & \cdots & H^{Nr,Nt}(k,i) \end{bmatrix} \quad (3)$$

represents a response of subcarriers from subcarrier i to subcarrier k.

FIG. 1 illustrates a structure of the response matrix H when the subcarriers of a communication system are orthogonal to each other. The shaded region of FIG. 1 refers to non-zeros elements of the response matrix H. The blank region of FIG. 1 refers to zero elements of the response matrix H. The orthogonality makes the cross-talk between the subcarriers is eliminated and there is no inter-carrier interference. Therefore, as shown FIG. 1, there is no inter-carrier interference from other subcarriers for any H(k,i).

Figure 2A:
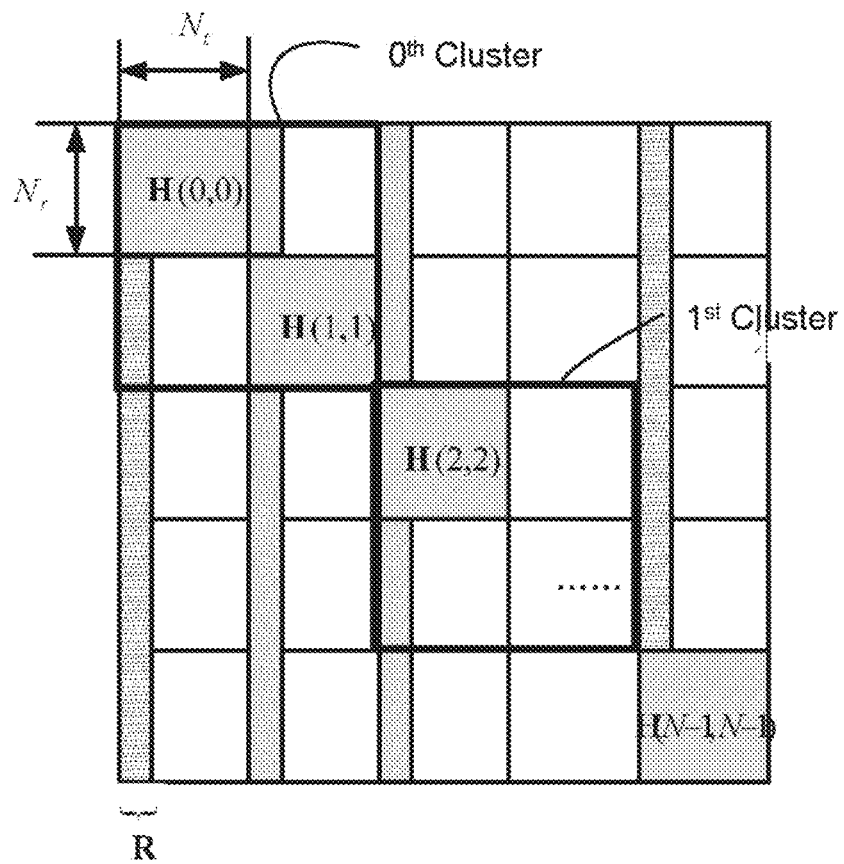
FIG. 2A shows a structure of a response matrix of a communication system when some of the subcarriers of the communication system are no longer orthogonal to each other.

FIG. 2A illustrates a structure of the response matrix H when some of the subcarriers of a communication system are no longer orthogonal to each other. The shaded region of FIG. 2A refers to non-zeros elements of the response matrix H. The blank region of FIG. 2A refers to zero elements of the response matrix H. Any of H(k,i) in FIG. 2A, where k and i are integers and both from 0 to (N−1), has Nt columns and Nr rows. In the Nt transmit antennas, R transmit antennas are moving toward to or away from Nr receive antennas and the rest (Nt-R) transmit antennas are relatively still relative to the Nr receive antennas while the data is transmitting. In some embodiments, the Doppler effect caused by the R transmit antennas may affect the orthogonality between the subcarriers and makes the data detection of the communication system more complicated. The response matrix H may be divided into a plurality of clusters for further processing to minimize the inter-carrier interference. The clusters may be indexed as even-indexed clusters and odd-indexed clusters in sequence along the main diagonal of the response matrix H as shown in FIG. 2A. In some embodiments, a cluster may include four H(k,i)s. The subcarriers associated with a first cluster may not be overlapped by the subcarriers associated with a second cluster.

Figure 2B:
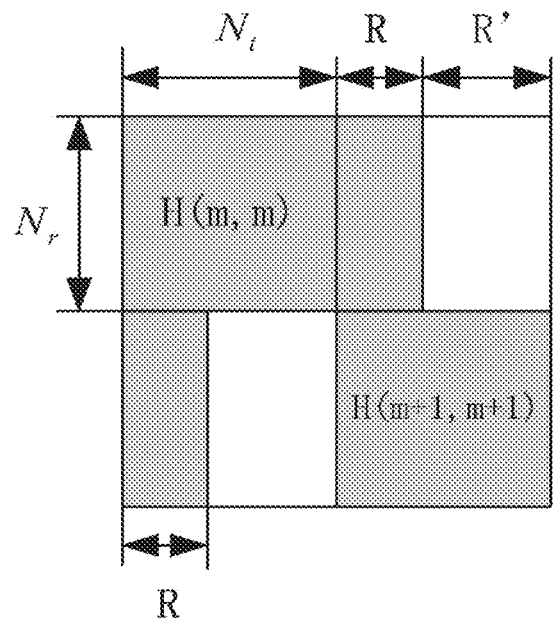
FIG. 2B shows a structure of a m/2-th cluster of the response matrix shown in FIG. 2A, wherein m is an even number.
Figure 2C:
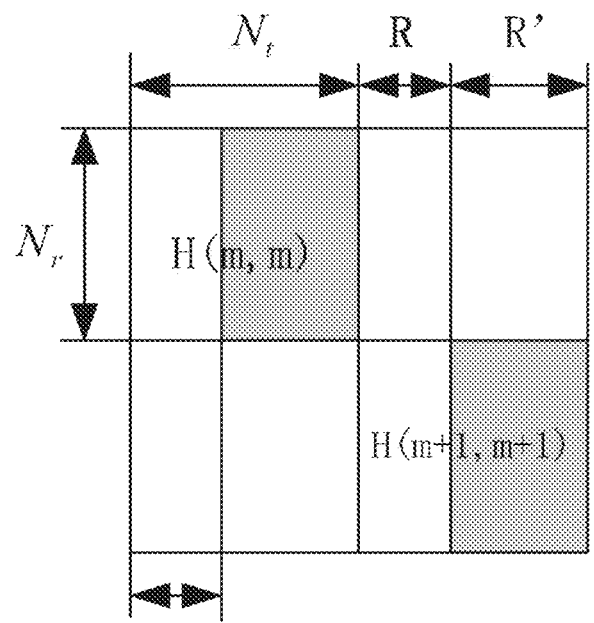
FIG. 2C shows a structure of the m/2-th cluster shown in FIG. 2B after being processed, wherein m is an even number.

FIG. 2B illustrates a structure of a m/2-th cluster of the response matrix H shown in FIG. 2A, wherein m is an even number. In some embodiments, m is an integer and from 0 to (N−1). For the m/2-th cluster, the equivalent subcarriers are (m, m+1). FIG. 2C illustrates a structure of a processed m-th cluster and will be further discussed below.

Figure 3A:
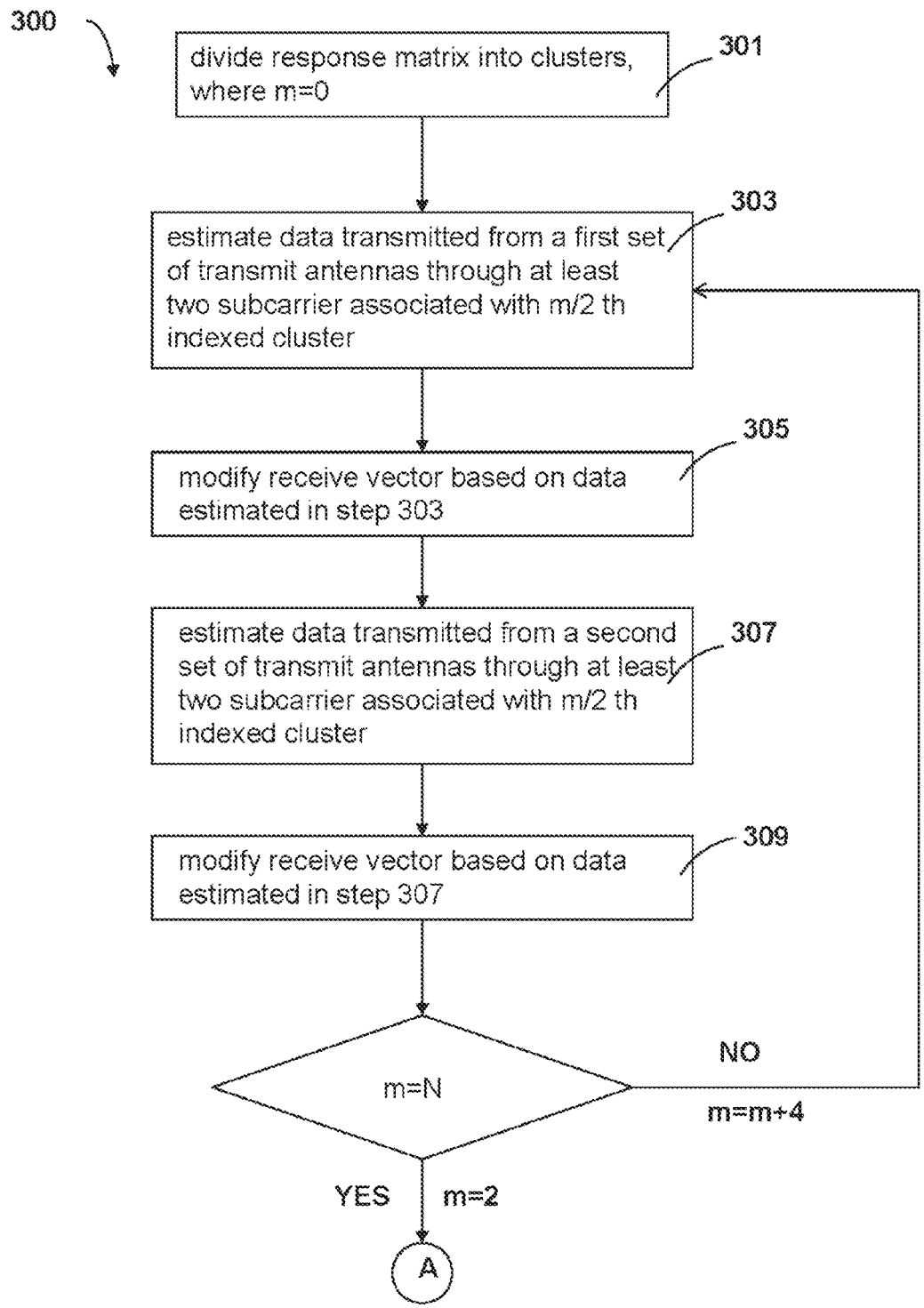
FIGS. 3A-3B illustrate a flow chart of a method for processing a response matrix of a communication system.
Figure 3B:
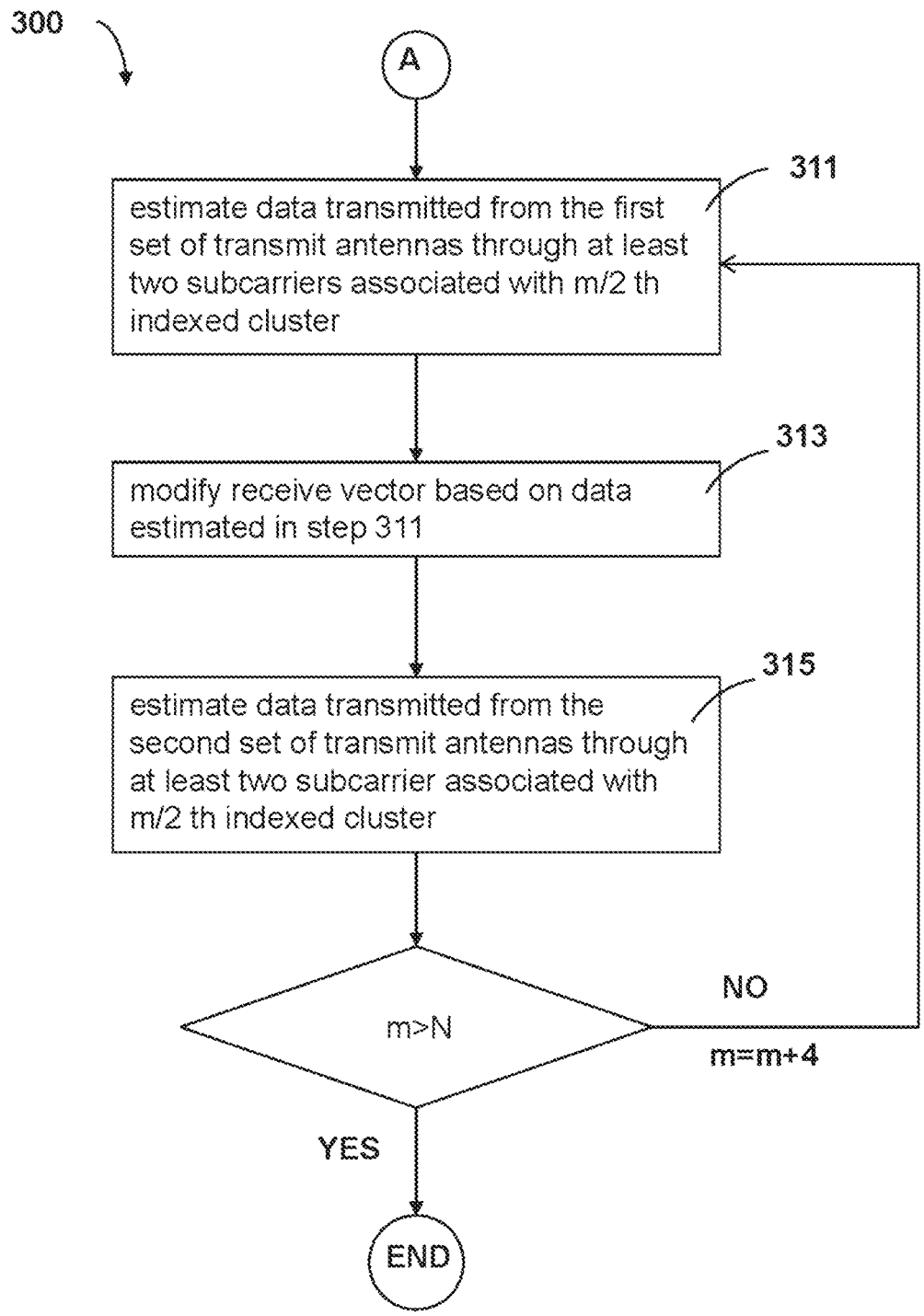

FIGS. 3A-3B illustrate a flow chart of an illustrative embodiment of a method 300 for processing a response matrix (e.g., the response matrix H set forth above) of a communication system. In block 301, the response matrix is divided into a plurality of clusters. In some embodiments, the number of the clusters is associated with the number of subcarriers of the communication system, the maximum Doppler frequency, and the sampling rate. For example, the number of the clusters may be $N/\lceil (f_d NT\_s) + 1 \rceil$, where N is the number of subcarriers, $f_d$ is the maximum Doppler frequency, $T\_s$ is the sampling rate and $\lceil . \rceil$ means Ceiling function. In some example communication systems, $\lceil (f_d NT\_s) + 1 \rceil$ is 2. The clusters may be indexed in sequence as even-indexed clusters and odd-indexed clusters. In some embodiments, the first cluster is indexed as zero.

For the m-th cluster, the relationship between the receiver and the transmitter of the communication system may be expressed as:

$$\begin{bmatrix} Y(m) \\ Y(m+1) \end{bmatrix} = \begin{bmatrix} H(m,m) & H(m,m+1) \\ H(m+1,m) & H(m+1,m+1) \end{bmatrix} \quad (4)$$

$$\begin{bmatrix} X(m) \\ X(m+1) \end{bmatrix} + \begin{bmatrix} W(m) \\ W(m+1) \end{bmatrix},$$

$$\text{let } \overline{Y} = \begin{bmatrix} Y(m) \\ Y(m+1) \end{bmatrix},$$

$$\overline{H} = \begin{bmatrix} H(m,m) & H(m,m+1) \\ H(m+1,m) & H(m+1,m+1) \end{bmatrix},$$

$$\overline{X} = \begin{bmatrix} X(m) \\ X(m+1) \end{bmatrix} \text{ and}$$

$$\overline{W} = \begin{bmatrix} W(m) \\ W(m+1) \end{bmatrix}, \text{ equation (4) may be rewritten as:}$$

$$\overline{Y} = \overline{H}\overline{X} + \overline{W} \quad (5)$$

Detecting Data in Even-Indexed Clusters

The method 300 continues in block 303. In block 303, the data transmitted from a first set of moving transmit antennas through two subcarriers (e.g., first subcarrier and second subcarrier) associated with the current cluster (e.g., first even-indexed cluster) is estimated. In some embodiments, the first set of moving transmit antennas contributes the Doppler effect in the communication system.

In some embodiments, the data transmitted from the first set of moving transmit antennas through the two subcarriers (e.g., first subcarrier and second subcarrier) is estimated by linear minimum mean-square-error equalization:

$$\hat{X}(1:R) = (\overline{H}(:,1:R))^H (\overline{H}\overline{H}^H + \sigma_z^2 I_{DM})^{-1} \overline{Y},$$

$$\hat{X}(1+N_t:R+N_t) = (\overline{H}(:,1+N_t:R+N_t))^H (\overline{H}\overline{H}^H + \sigma_z^2 I_{DN_t})^{-1} \overline{Y}, \quad (6)$$

where $\hat{X}(1:R)$ and $\hat{X}(1+N_t:R+N_t)$ denote the estimated data transmitted from antenna 1 to antenna R of the two subcarriers (e.g., first subcarrier and second subcarrier) associated with the current cluster (e.g., first even-indexed cluster), respectively, $\overline{H}(:,\alpha:\beta)$ is the sub-matrix of $\overline{H}$ from column $\alpha$ to $\beta$, $\sigma^2$ is the power of $\overline{W}$ and I is an identity matrix with dimension of $2N_r$.

The method 300 continues in block 305. In block 305, the receive vector Y is modified based on the $\hat{X}(1:R)$ and $\hat{X}(1+$ $N_r:R+N_t$) estimated in equation (6). In some embodiments, the receive vector Y is modified to remove elements associated with the transmit antenna 1 to transmit antenna R in order to cancel the inter-channel interference. The receive vector Y may be modified as:

$$Y=Y-H(:,1:R)\hat{X}(1:R)-H(:,1+N_r:R+N_t)\hat{X}(1+N_r:R+N_t). \quad (7)$$

After the receive vector Y is modified, setting non-zeros elements associated with the antenna 1 to antenna R in H as zeros. In some embodiments, the structure of $\overline{H}$ is illustrated in FIG. 2C. In FIG. 2C, $\overline{H}(:,1:R)=0$ and $\overline{H}(:,N_t+1:N_t+R)=0$. As shown in FIG. 2C, H(m,m) and H(m+1,m+1) are separated by zero elements and thus there is no inter-channel interference between the subcarrier m and the subcarrier (m+1).

The method continues in block 307. In block 307, the data transmitted from a second set of transmit antennas through the two subcarriers (e.g., first subcarrier and second subcarrier) associated with the current cluster (e.g., first even-indexed cluster) is estimated based on the receive vector modified in block 305. The second set of transmit antenna is relatively still with respect to the receiver of the communication system while the data is transmitting.

Let $\tilde{H}=\overline{H}(1:N_r,R+1:N_t)$, $\hat{H}=\overline{H}(N_r+1:2N_r,N_t+R+1:2N_t)$, where $\overline{H}(a:b, c:d)$ is the submatrix of $\overline{H}$ from row a to b, and from column c to d, then, $$\hat{X}(R+1:N_t)=(\tilde{H}^H\tilde{H}+\sigma^2 I_{N_t-R})^{-1}\tilde{H}^H\overline{Y}(1:N_r) \quad (8)$$

$$\hat{X}(N_t+R+1:2N_t)=(\hat{H}^H\hat{H}+\sigma^2 I_{N_t-R})^{-1}\hat{H}^H\overline{Y}(N_r+1:2N_r). \quad (9)$$

The method 300 goes back to block 303 and with m being set to (m+4), so that the method 300 may include (a) estimating the data transmitted from the first set of moving transmit antennas through another two subcarriers (e.g., third subcarrier and fourth subcarrier) associated with another even-indexed cluster (e.g., second even-indexed cluster); (b) modifying the receive vector Y based on the data estimated in (a); (c) estimating the data transmitted from the second set of transmit antennas through the two subcarriers (e.g., third subcarrier and fourth subcarrier) associated with the current cluster (e.g., second even-indexed cluster) based on the receive vector Y modified in (b); The method 300 continues until m=N.

Detecting Data in Odd-Indexed Clusters

When m=N, the method 300 sets m as 2 and continues in block 311 in FIG. 3B. In block 311, the data transmitted from the first set of moving transmit antennas through another two subcarriers (e.g., fifth subcarrier and sixth subcarrier) associated with an odd-indexed cluster (e.g., first odd-indexed cluster) is estimated. In some embodiments, the first set of moving transmit antennas contributes the Doppler effect in the communication system.

In some embodiments, the data transmitted from the first set of moving transmit antennas through the two subcarriers (e.g., fifth subcarrier and sixth subcarrier) associated with the current cluster (e.g., first odd-indexed cluster) is estimated by linear minimum mean-square-error equalization:

$$\hat{X}(1:R)=(\overline{H}(:,1:R))^H(\overline{H}\overline{H}^H+\sigma_z^2 I_{DM})^{-1}\overline{Y}$$

$$\hat{X}(1+N_r:R+N_t)=(\overline{H}(:,1+N_r:R+N_t))^H(\overline{H}\overline{H}^H+\sigma_z^2 I_{DN_r})^{-1}\overline{Y}, \quad (11)$$

where $\hat{X}(1:R)$ and $\hat{X}(1+N_r:R+N_t)$ denote the estimated data transmitted from antenna 1 to antenna R through the two subcarriers (e.g., fifth subcarrier and sixth subcarrier) in the current cluster (e.g., first odd-indexed cluster), respectively, $\overline{H}(:, \alpha:\beta)$ is the sub-matrix of $\overline{H}$ from column $\alpha$ to $\beta$, $\sigma^2$ is the power of $\overline{W}$ and I is an identity matrix with dimension of $2N_r$.

The method 300 continues in block 313. In block 313, the receive vector Y is modified based on the $\hat{X}_{1:R}(i)$ estimated in equation (11). In some embodiments, the receive vector Y is modified to remove elements associated with the transmit antenna 1 to transmit antenna R in order to cancel the inter-channel interference. The receive vector Y may be modified as:

$$\overline{Y}=\overline{Y}-\overline{H}(:,1:R)\hat{X}(1:R)-\overline{H}(:,1+N_r:R+N_t)\hat{X}(1+N_r:R+N_t). \quad (12)$$

After the receive vector Y is modified, setting non-zeros elements associated with the antenna 1 to antenna R in $\overline{H}$ as zeros. In some embodiments, the structure of $\overline{H}$ is illustrated in FIG. 2C. In FIG. 2C, $\overline{H}(:,1:R)=0$ and $\overline{H}(:,N_t+1:N_t+R)=0$.

The method continues in block 315. In block 315, the data transmitted from the second set of transmit antennas through the two subcarriers (e.g., fifth subcarrier and sixth subcarrier) associated with the current cluster (e.g., first odd-indexed cluster) is estimated based on the receive vector Y modified in block 313. The second set of transmit antenna is relatively still with respect to the receiver of the communication system while the data is transmitting.

Let $\tilde{H}=\overline{H}(1:N_r,R+1:N_t)$, $\hat{H}=\overline{H}(N_r+1:2N_r,N_t+R+1:2N_t)$ then, $$\hat{X}(R+1:N_t)=(\tilde{H}^H\tilde{H}+\sigma^2 I_{N_t-R})^{-1}\tilde{H}^H\overline{Y}(1:N_r) \quad (13)$$

$$\hat{X}(N_{t+1}R+1:2N_t)=(\hat{H}^H\hat{H}+\sigma^2 I_{N_t-R})^{-1}\hat{H}^H\overline{Y}(N_r+1:2N_r). \quad (14)$$

The method 300 goes back to block 311 with m being set to (m+4), so that the method 300 may include (a) estimating the data transmitted from the first set of moving transmit antennas through another two subcarriers (e.g., seventh subcarrier and eighth subcarrier) associated with another odd-indexed cluster (e.g., second odd-indexed cluster); (b) modifying the receive vector Y based on the data estimated in (a); and (c) estimating the data transmitted from the second set of transmit antennas through the two subcarriers (e.g., seventh subcarrier and eighth subcarrier) associated with the current cluster (e.g., second odd-indexed) based on the receive vector Y modified in (b). The method 300 continues until m>N.

Figure 4:
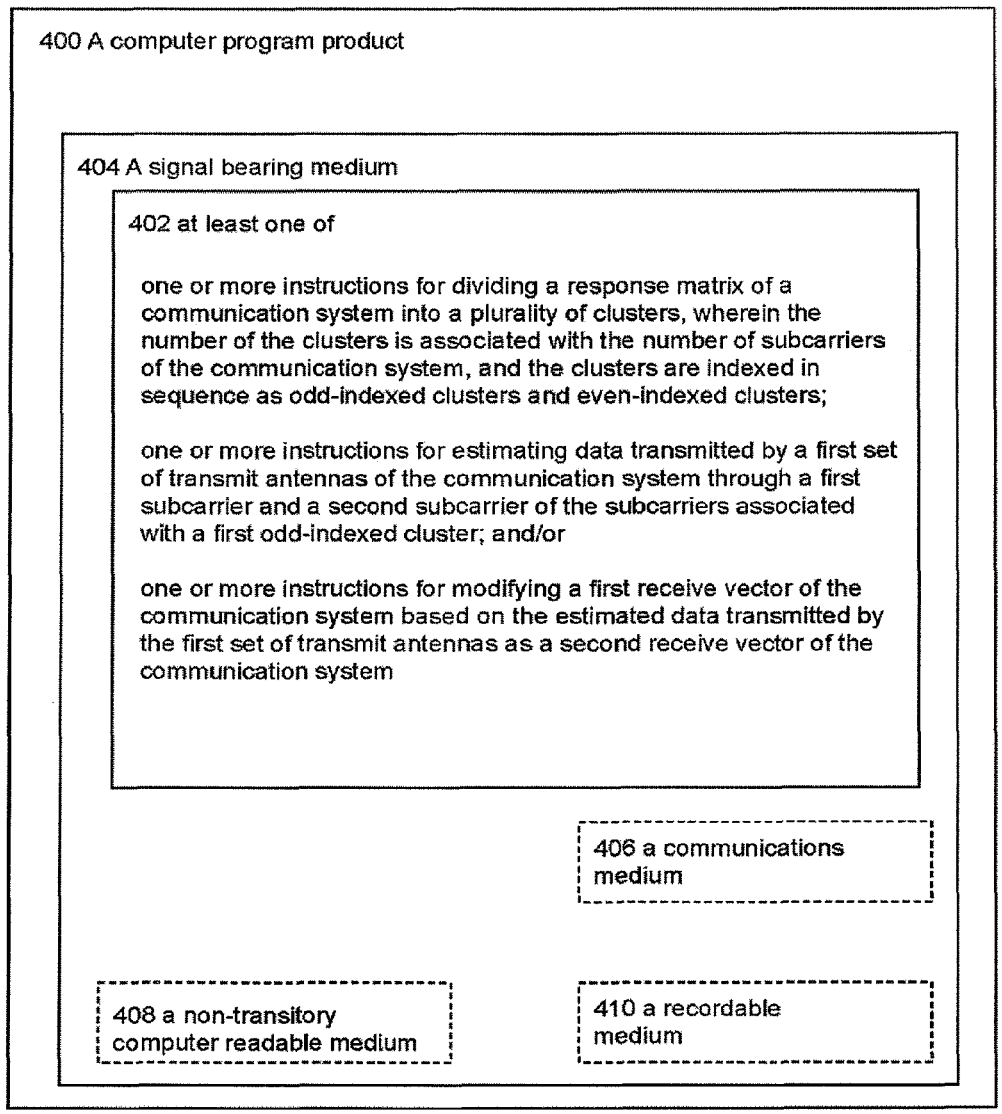
FIG. 4 shows a block diagram illustrating a computer program product that is arranged for processing a response matrix of a communication system.

FIG. 4 shows a block diagram illustrating a computer program product that is arranged for processing a response matrix of a communication system. The computer program product 400 may include a signal bearing medium 404, which may include one or more sets of executable instructions 402 that, when executed by, for example, a processor of a computing device, may provide at least the functionality described above and illustrated in FIGS. 3A-3B.

In some implementations, the signal bearing medium 404 may encompass a non-transitory computer readable medium 408, such as, but not limited to, a hard disk drive, a Compact Disc (CD), a Digital Versatile Disk (DVD), a digital tape, memory, etc. In some implementations, the signal bearing medium 404 may encompass a recordable medium 410, such as, but not limited to, memory, read/write (R/W) CDs, R/W DVDs, etc. In some implementations, the signal bearing medium 404 may encompass a communications medium 406, such as, but not limited to, a digital and/or an analog communication medium (e.g., a fiber optic cable, a waveguide, a wired communications link, a wireless communication link, etc.) The computer program product 400 may also be recorded in the non-transitory computer readable medium 408 or another similar recordable medium 410.

Figure 5:
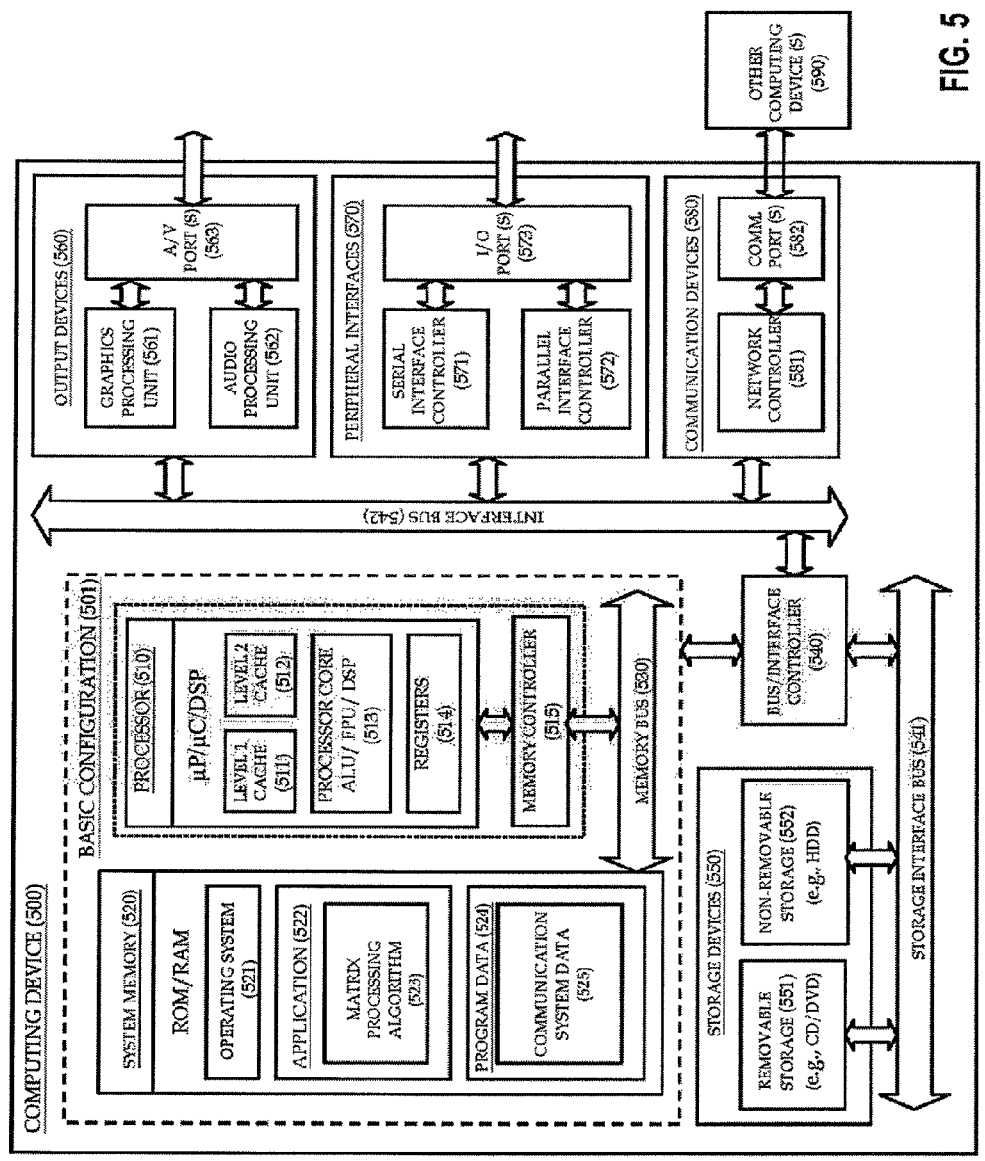
FIG. 5 shows a block diagram of an illustrative embodiment of a computing device that is arranged for processing a response matrix of a communication system; all arranged in accordance with some embodiments of the present disclosure.

FIG. 5 shows a block diagram of an illustrative embodiment of a computing device that is arranged for processing a response matrix of a communication system. In a very basic configuration 501, computing device 500 typically includes one or more processors 510 and a system memory 520. A memory bus 530 may be used for communicating between processor 510 and system memory 520.

Depending on the desired configuration, processor 510 may be of any type including but not limited to a microprocessor (µP), a microcontroller (µC), a digital signal processor (DSP), or any combination thereof. Processor 510 may include one more levels of caching, such as a level one cache 511 and a level two cache 512, a processor core 513, and registers 514. An example processor core 513 may include an arithmetic logic unit (ALU), a floating point unit (FPU), a digital signal processing core (DSP Core), or any combination thereof. An example memory controller 515 may also be used with processor 510, or in some implementations memory controller 515 may be an internal part of processor 510.

Depending on the desired configuration, system memory 520 may be of any type including but not limited to volatile memory (such as RAM), non-volatile memory (such as ROM, flash memory, etc.) or any combination thereof. System memory 520 may include an operating system 521, one or more applications 522, and program data 524. In some embodiments, application 522 may include a matrix processing algorithm 523 that is arranged to perform the functions as described herein including those described with respect to the blocks 301, 303, 305, 307, 309, 311, 313 and 315 of the method 300 of FIGS. 3A and 3B. Program data 524 may include communication system data 525 that may be useful for the operation of matrix processing algorithm 523 as described herein. In some embodiments, the communication system data 525 may include, without limitation, a response matrix and a receive vector of the communication system. In some embodiments, application 522 may be arranged to operate with program data 524 on operating system 521, such that implementations of processing the response matrix may be provided as described herein. This described basic configuration 501 is illustrated in FIG. 5 by those components within the inner dashed line.

Computing device 500 may have additional features or functionality, and additional interfaces to facilitate communications between basic configuration 501 and any required devices and interfaces. For example, a bus/interface controller 540 may be used to facilitate communications between basic configuration 501 and one or more data storage devices 550 via a storage interface bus 541. Data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 520, removable storage devices 551 and non-removable storage devices 552 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 542 for facilitating communication from various interface devices (e.g., output devices 560, peripheral interfaces 570, and communication devices 580) to basic configuration 501 via bus/interface controller 540. Example output devices 560 include a graphics processing unit 561 and an audio processing unit 562, which may be configured to communicate to various external devices such as a display or speakers via one or more NV ports 563. Example peripheral interfaces 570 include a serial interface controller 571 or a parallel interface controller 572, which may be configured to communicate with external devices such as input devices (e.g., keyboard, mouse, pen, voice input device, touch input device, etc.) or other peripheral devices (e.g., printer, scanner, etc.) via one or more I/O ports 573. An example communication device 580 includes a network controller 581, which may be arranged to facilitate communications with one or more other computing devices 590 over a network communication link via one or more communication ports 582. In some embodiments, the other computing devices 590 may include other applications, which may be operated based on the results of the application 522.

The network communication link may be one example of a communication media. Communication media may typically be embodied by computer readable instructions, data structures, program modules, or other data in a modulated data signal, such as a carrier wave or other transport mechanism, and may include any information delivery media. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for processing a response matrix of a communication system, comprising:
   dividing the response matrix into a plurality of clusters, wherein the number of the clusters is associated with the number of subcarriers of the communication system, and the clusters are indexed in sequence as even-indexed clusters and odd-indexed clusters;
   estimating data transmitted by a first set of transmit antennas of the communication system through a first subcarrier and a second subcarrier of the subcarriers associated with a first even-indexed cluster; and
   modifying a first receive vector of the communication system based on the estimated data transmitted by the first set of transmit antennas as a second receive vector of the communication system.

2. The method of claim 1, wherein the number of the clusters is associated with the number of the subcarriers and the maximum Doppler frequency in the communication system.

3. The method of claim 1, wherein the number of the clusters is half of the number of the subcarriers of the communication system.

4. The method of claim 1, wherein the first set of transmit antennas are moving relatively to one or more receive antennas of the communication system when the first set of transmit antennas transmits data.

5. The method of claim 1, wherein the first set of transmit antennas are associated with a Doppler effect in the communication system.

6. The method of claim 1, further comprising estimating data transmitted by a second set of transmit antennas of the communication system through the first subcarrier and the second subcarrier of the subcarriers based on the second receive vector.

7. The method of claim 6, wherein the second set of transmit antennas are relatively still with respect to one or more receive antennas of the communication system when the second set of transmit antennas transmits data.

8. The method of claim 6, further comprising modifying the second receive vector based on the estimated data transmitted by the second set of transmit antennas of the communication system through the first subcarrier and the second subcarrier of the subcarriers as a third receive vector of the communication system.

9. The method of claim 8, further comprising estimating data transmitted from the first set of transmit antennas through a third subcarrier and a fourth subcarrier of the subcarriers associated with a second even-indexed cluster.

10. The method of claim 9, further comprising modifying the third receive vector based on the estimated data transmitted from the first set of transmit antennas through the third subcarrier and the fourth subcarrier as a fourth receive vector of the communication system and estimating data transmitted from the second set of transmit antennas through the third subcarrier and the fourth subcarrier based on the fourth receive vector.

11. The method of claim 10, further comprising estimating data transmitted by the first set of transmit antennas of the communication system through a fifth subcarrier and a sixth subcarrier of the subcarriers associated with a first odd-indexed cluster.

12. A computing device configured to process a response matrix of a communication system, comprising:
   a processor unit configured to
      divide the response matrix into a plurality of clusters; wherein the number of the clusters is associated with the number of subcarriers of the communication system and the clusters are indexed in sequence as even-indexed clusters and odd-indexed clusters;
      estimate data transmitted by a first set of transmit antennas of the communication system through a first subcarrier and a second subcarrier of the subcarriers associated with a first even-indexed cluster; and
      modify a first receive vector of the communication system based on the estimated data transmitted by the first set of transmit antennas as a second receive vector of the communication system.

13. The computing device of claim 12, wherein the number of the clusters is associated with the number of the subcarriers and the maximum Doppler frequency in the communication system.

14. The computing device of claim 12, wherein the number of the clusters is half of the number of the subcarriers of the communication system.

15. The computing device of claim 12, wherein the processor unit is further configured to estimate data transmitted by a second set of transmit antennas of the communication system through the first subcarrier and the second subcarrier of the subcarriers based on the second receive vector.

16. The computing device of claim 15, wherein the processor unit is further configured to modify the second receive vector based on the estimated data transmitted by the second set of transmit antennas of the communication system through the first subcarrier and the second subcarrier of the subcarriers as a third receive vector of the communication system.

17. The computing device of claim 16, wherein the processor unit is further configured to estimate data transmitted from the first set of transmit antennas through a third subcarrier and a fourth subcarrier of the subcarriers associated with a second even-indexed cluster.

18. The computing device of claim 17, wherein the processor unit is further configured to modify the third receive vector based on the estimated data transmitted from the first set of transmit antennas through the third subcarrier and the fourth subcarrier as a fourth receive vector of the communication system and estimate data transmitted from the second set of transmit antennas through the third subcarrier and the fourth subcarrier based on the fourth receive vector.

19. The computing device of claim 18, wherein the processor unit is further configured to estimate data transmitted by the first set of transmit antennas of the communication system through a fifth subcarrier and a sixth subcarrier of the subcarriers associated with a first odd-indexed cluster.

20. A non-transitory computer-readable storage medium encoded with computer-executable instructions for processing a response matrix of a communication system, which when executed by a computing device, causes the computing device to:
   divide the response matrix into a plurality of clusters; wherein the number of the clusters is associated with the number of subcarriers of the communication system and the clusters are indexed in sequence as even-indexed clusters and odd-indexed clusters;

estimate data transmitted by a first set of transmit antennas of the communication system through a first subcarrier and a second subcarrier of the subcarriers associated with a first even-indexed cluster; and modify a first receive vector of the communication system based on the estimated data transmitted by the first set of transmit antennas as a second receive vector of the communication system.

\* \* \* \* \*

UNITED STATES PATENT AND TRADEMARK OFFICE
CERTIFICATE OF CORRECTION

PATENT NO. : 9,240,915 B2
APPLICATION NO. : 14/361705
DATED : January 19, 2016
INVENTOR(S) : Xiao et al.

It is certified that error appears in the above-identified patent and that said Letters Patent is hereby corrected as shown below:

In the specification,

In Column 1, Line 8, delete "§371" and insert -- § 371 --, therefor.

In Column 3, after Equation (2), insert -- , --.

In Column 5, Line 1, delete "Ni)" and insert -- Nt) --, therefor.

In Column 8, Line 9, delete "NV ports" and insert -- A/V ports --, therefor.

Signed and Sealed this
Twenty-eighth Day of June, 2016

Michelle K. Lee
*Director of the United States Patent and Trademark Office*